(12) United States Patent
Umar (10) Patent No.: US 12,139,419 B1
(45) Date of Patent: Nov. 12, 2024

(54) SOLAR POWERED WATER PURIFICATION SYSTEM

(71) Applicant: Naeem Umar, Desert Hot Springs, CA (US)

(72) Inventor: Naeem Umar, Desert Hot Springs, CA (US)

(*) Notice: Subject to any disclaimer, the term of this patent is extended or adjusted under 35 U.S.C. 154(b) by 0 days.

(21) Appl. No.: 18/646,344

(22) Filed: Apr. 25, 2024

Related U.S. Application Data (60) Provisional application No. 63/498,307, filed on Apr. 26, 2023.

(51) Int. Cl.
| | |
|---|---|
| *B01D 3/00* | (2006.01) |
| *B01D 1/00* | (2006.01) |
| *B01D 11/04* | (2006.01) |
| *C02F 1/04* | (2023.01) |
| *C02F 1/14* | (2023.01) |
| *F03G 6/00* | (2006.01) |

(52) U.S. Cl.
CPC .............. *C02F 1/14* (2013.01); *C02F 1/043* (2013.01); *C02F 2201/002* (2013.01)

(58) Field of Classification Search
CPC ...... B01D 1/0035; B01D 3/00; B01D 5/0066; C02F 1/043; F03G 6/00
USPC .......... 422/255, 260, 285; 203/86; 202/234; 60/641.15, 398
See application file for complete search history.

(56) References Cited

U.S. PATENT DOCUMENTS

| | | | |
|---|---|---|---|
| 2007/0245730 A1* | 10/2007 | Mok | F03G 6/0055 60/641.8 |
| 2011/0120854 A1* | 5/2011 | Lee | B01D 1/0035 203/86 |
| 2015/0223409 A1* | 8/2015 | Abahusayn | A01G 9/14 47/17 |

* cited by examiner

*Primary Examiner* — Monzer R Chorbaji (57) ABSTRACT

The solar powered water purification device is intended to provide users with an apparatus for the rapid purification of dirty water to drinkable water, using only the power of the sun. To accomplish this, the device uses an insulated tub and a detachable solar panel with an extra sheet of glass to trap heat that can power all the electrical components of the distillation unit as well as heat up the impure water in the insulated tub. The insulated solar panel has a temperature sensitive vent to prevent the panel from overheating if there is no water in the unit. To prevent the unit from collapsing from the vacuum, the unit uses a grill that has many hollow legs that also act like thermal tubes to quickly move the heat from the panels to the dirty water. Thus, the device is an energy efficient and cost-efficient apparatus for water purification.

20 Claims, 7 Drawing Sheets

SOLAR POWERED WATER PURIFICATION SYSTEM

CROSS-REFERENCE TO RELATED APPLICATIONS

The current application claims priority to the U.S. Provisional Patent application Ser. No. 63/498,307 filed on Apr. 26. 2023.

FIELD OF THE INVENTION

The present invention relates generally to a physical apparatus. More specifically, the present invention is an apparatus for the rapid purification of dirty salt water to drinkable water, using only the power of the sun.

BACKGROUND OF THE INVENTION

A water distiller removes fluoride, organic compounds, dissolved salts and solids, lead, and other heavy metals, and almost all other impurities from water. By converting water into steam, a water distiller is able to discard all contaminants from the water it is purifying. Vacuum distillation or distillation under reduced pressure is a type of distillation performed under reduced pressure, which allows the purification of compounds not readily distilled at ambient pressures or simply to save time or energy. This technique separates compounds based on differences in their boiling points. However, most of the distillation units rely on electricity to heat the impure water, and to run other electrical components such as the condenser, the vacuum pump, etc. This is not a very efficient method for water purification because of energy concerns. A distillation unit that works solely on renewable sources of energy, such as the energy from the sun or solar energy is a rare find in the current market.

An objective of the present invention is to provide users with apparatus for the rapid purification of dirty salt water to drinkable water, using only the power of the sun. More specifically, the present invention comprises an insulated tub and a detachable solar panel that can power all the electrical components of the distillation unit as well as heat up the impure water in the insulated tub. Thus, the present invention provides an energy efficient and cost-efficient apparatus for water purification that is simple yet enables rapid purification of water.

SUMMARY OF THE INVENTION

The solar powered water purification device is intended to provide users with an apparatus for the rapid purification of dirty salt water to drinkable water, using only the power of the sun. More specifically, the present invention uses the heat of the sun to heat the water for distillation and the current from the solar panel to power vacuum to lower the boiling temperature for quicker results. To accomplish this, the present invention comprises an insulated tub and a detachable solar panel with an extra sheet of glass to trap heat that can power all the electrical components of the distillation unit as well as heat up the impure water in the insulated tub. The insulated solar panel has a temperature sensitive vent to prevent the panel from overheating if there is no water in the unit. To prevent the unit from collapsing from the vacuum, the unit uses a grill that has many hollow legs that also act like thermal tubes to quickly move the heat from the panels to the dirty water. Thus, the present invention is an energy efficient and cost-efficient apparatus for water purification that is simple yet enables rapid purification of water.

DETAILED DESCRIPTION OF THE INVENTION

All illustrations of the drawings are for the purpose of describing selected versions of the present invention and are not intended to limit the scope of the present invention.

Figure 1:
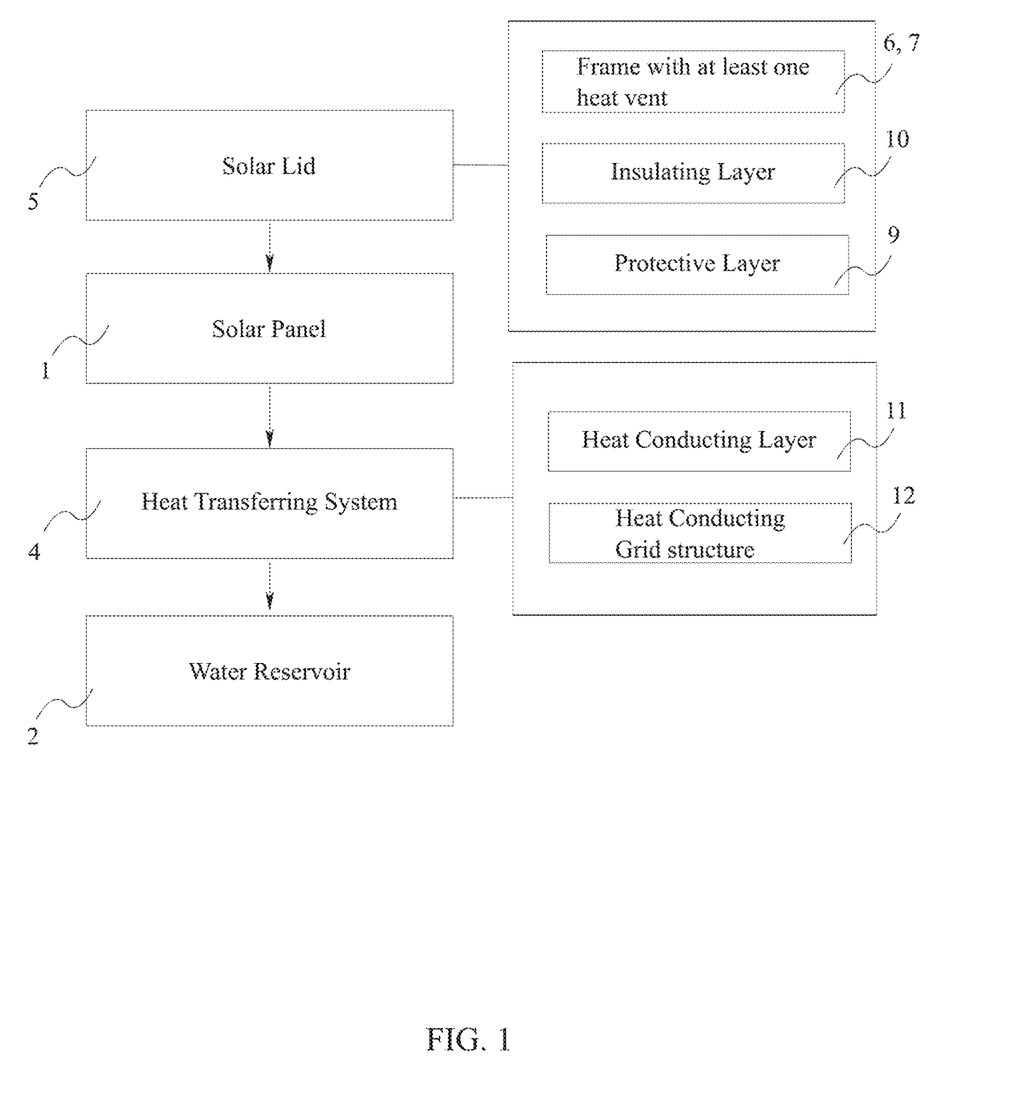
FIG. 1 is a block diagram of a solar powered water purification system, according to a preferred embodiment of the present invention.
Figure 7:
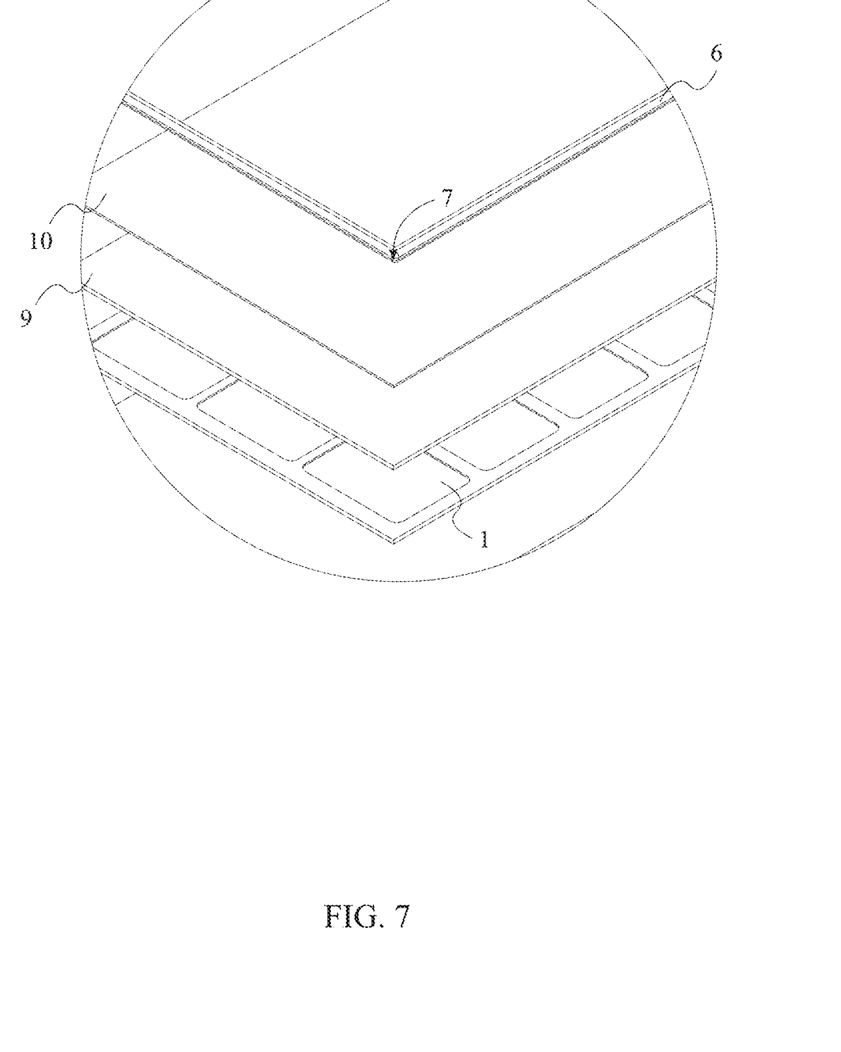
FIG. 7 is a detailed view of section 7 of FIG. 6.

In reference to FIG. 1 and FIG. 7, the present invention is a solar powered water purification system.

The following description is in reference to FIG. 1 through FIG. 7. According to a preferred embodiment, the present invention comprises a solar panel 1, a water reservoir 2, an inner cavity 3, and a heat transferring system 4. It is an aim of the present invention to use renewable sources of energy to run the entire water purification system or the distillation unit. To that end, the solar panel 1 is used to heat up water in the water reservoir 2 as well as provide electric power to the other electric and electronic components of the present invention. A solar panel is a device that converts sunlight into electricity by using photovoltaic (PV) cells. PV cells are made of materials that produce excited electrons when exposed to light. The electrons flow through a circuit and produce direct current (DC) electricity, which can be used to power various devices or be stored in batteries. Accordingly, the solar panel 1 in the preferred embodiment is used to both heat the water in the water reservoir 2 as well as provide electricity to the other components of the present invention. In the preferred embodiment, the solar panel 1 comprises a first surface 1a and a second surface 1b, wherein the first surface 1a is positioned opposite to the second surface 1b across the solar panel 1. Preferably, the solar panel 1 is a rectangular panel that fits within the dimensions of the water reservoir 2. However, it should be noted that the solar panel 1 may comprise any brand, size, shape, components, arrangement of components, etc. that are known to one of ordinary skill in the art, as long as the intents of the present invention are not altered.

Preferably, the water reservoir 2 is a cuboid structure made of a sturdy material that can hold water and the other components of the present invention. Further, the inner cavity 3 traverses into the water reservoir 2 or the cuboid, and the inner cavity 3 extends from a first end 2a of the water reservoir towards a second end 2b of the water reservoir 2, wherein the first end 2a is positioned opposite to the second end 2b across the water reservoir 2. However, the water reservoir 2 may comprise any other shape, material, components, arrangement of components, etc. that are known to one of ordinary skill in the art, as long as the intents of the present invention are not altered. Furthermore, in the preferred embodiment, the water reservoir 2 is black in color. This is so that maximum heat is retained inside the water reservoir 2 as black absorbs heat.

According to the preferred embodiment, the heat transferring system 4 helps in transferring the solar heat trapped by the solar panel 1 to the water in the water reservoir 2 for actuating distillation process. To accomplish this, the heat transferring system 4 is mounted within the inner cavity 3, and the solar panel 1 is thermally connected to the inner cavity 3 of the water reservoir 2 through the heat transferring system 4. In the preferred embodiment, the solar panel 1 is laterally offset from the second end 2b of the water reservoir 2 through the heat transfer system 4. This is so that water is not touching the solar panel 1 or other electrical components associated with the present invention.

Continuing with the preferred embodiment, the present invention comprises a solar lid 5, a frame 6, at least one heat sensitive vent 7, and a control unit 8. The solar lid 5 is the protective covering that is mounted on top of the solar panel 1 and covers the top of the water reservoir 2 thereby enabling faster heating of the water inside the water reservoir 2, faster evaporation, and thus faster distillation process. In other words, the solar lid 5 is mounted onto the first end 2a of the water reservoir 2, touching the second surface 1b of the solar panel 1. As seen in FIG. 1, and FIG. 4 through FIG. 6, the solar lid 5 comprises a protective glass layer 9 and an insulating layer 10. Preferably, the protective glass layer 9 is mounted onto the second surface 1b of the solar panel 1, and the insulating layer 10 is mounted onto the protective glass layer 9, wherein the insulating layer 10 provides thermal insulation to the solar panel 1. Further, the frame 6 is perimetrically mounted around the solar lid 5, and the at least one heat sensitive vent 7 is laterally integrated along the frame 6. The at least one heat sensitive vent 7 helps control the temperature within the water reservoir 2 and helps prevent overheating of the solar panel 1 in case the water reservoir 2 is empty of water. To enable controlling of the device at different thermal, electric, and electronic conditions, the control unit 8 is electronically connected to the solar panel 1, and the water reservoir 2. The control unit 8 controls the functioning of all the electrical and electronic components of the present invention. In other words, the control unit 8 is a processing device that manages the operation of the electrical components within the present invention. Preferably, the control unit 8 is an integrated circuit securely mounted and connected to different components of the present invention. It should be noted that the control unit 8 may comprise any brand, size, technology, components, arrangement of components, etc. that are known to one of ordinary skill in the art, as long as the intents of the present invention are not altered. Further, the control unit 8 is operatively connected to the at least one heat sensitive vent 7, wherein the control unit 8 actuates opening and closing of the at least one heat sensitive vent 7.

A more detailed description of the present invention follows.

Figure 4:
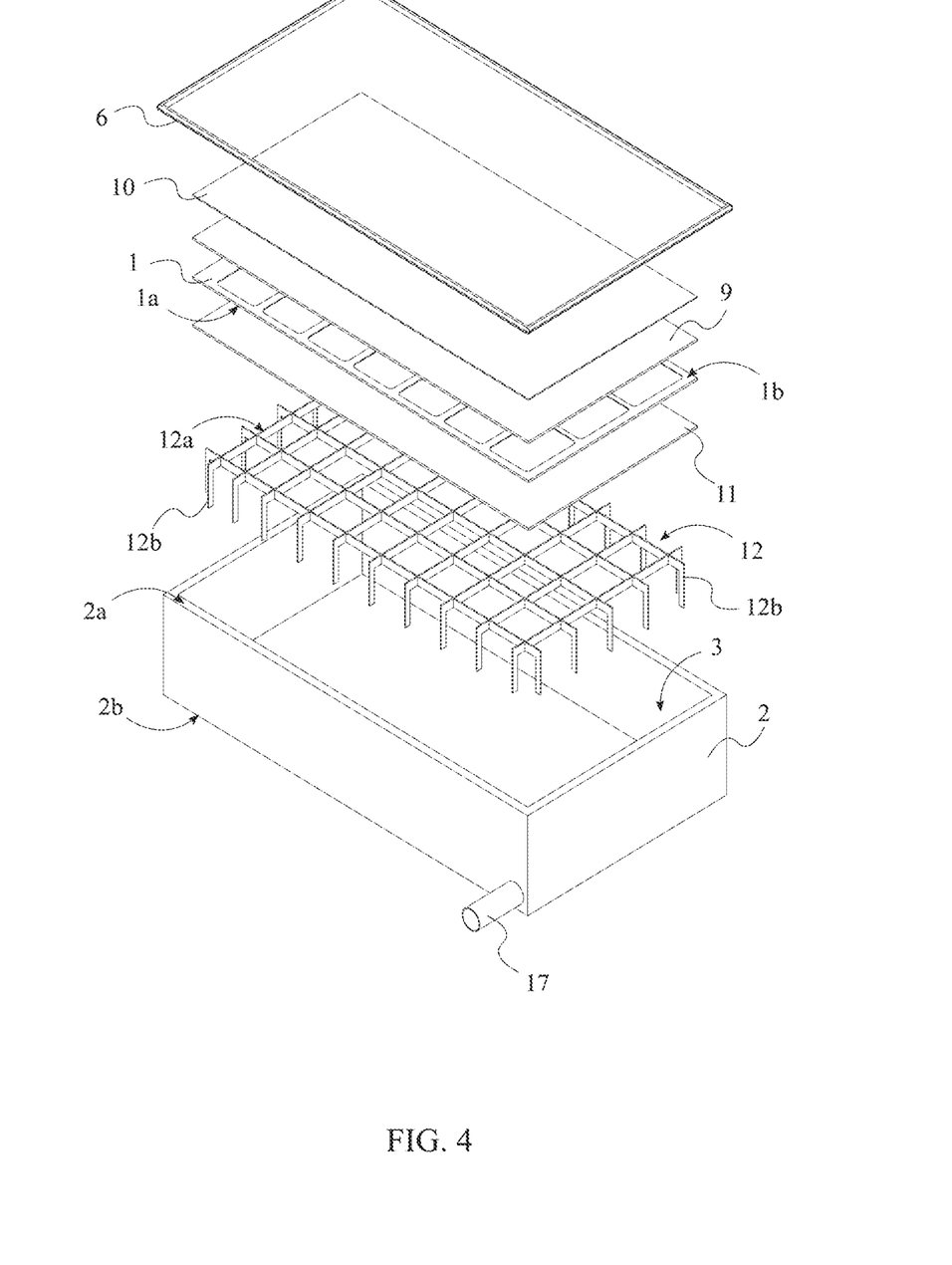
FIG. 4 is an exploded top-front-left perspective view of the present invention.
Figure 5:
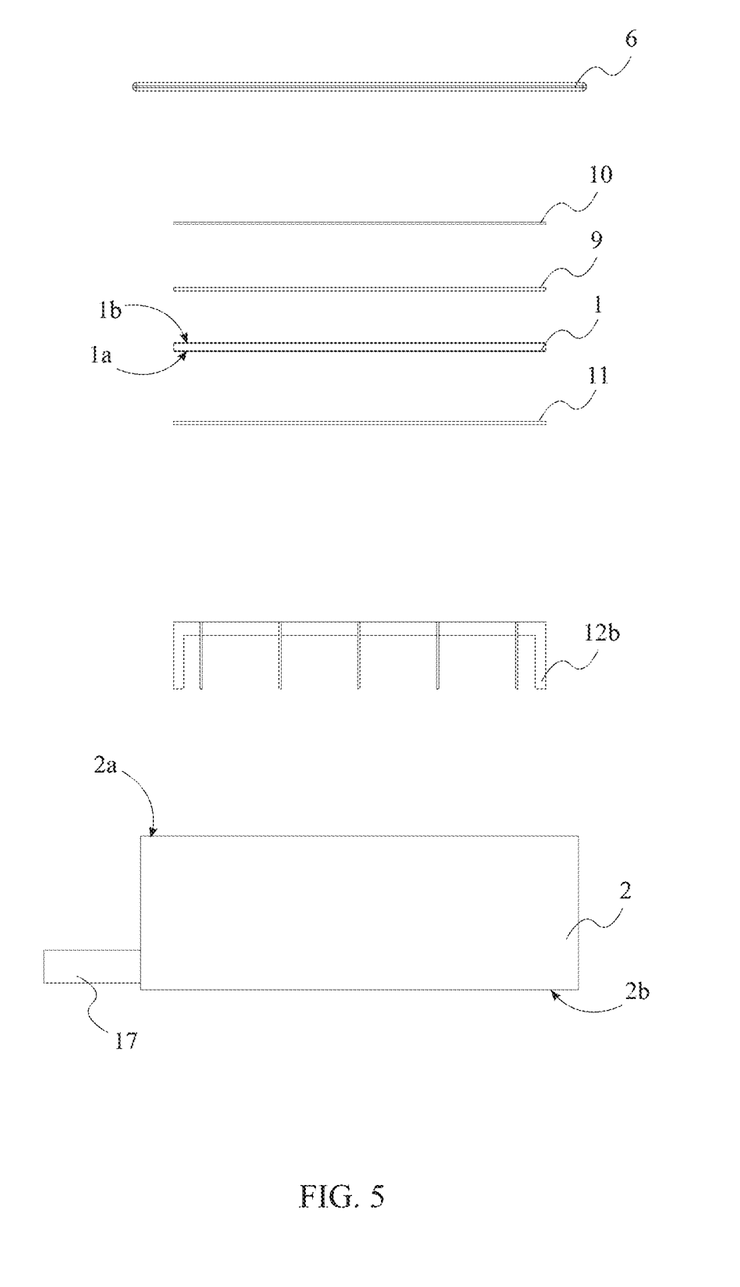
FIG. 5 is an exploded left side perspective view of the present invention.
Figure 6:
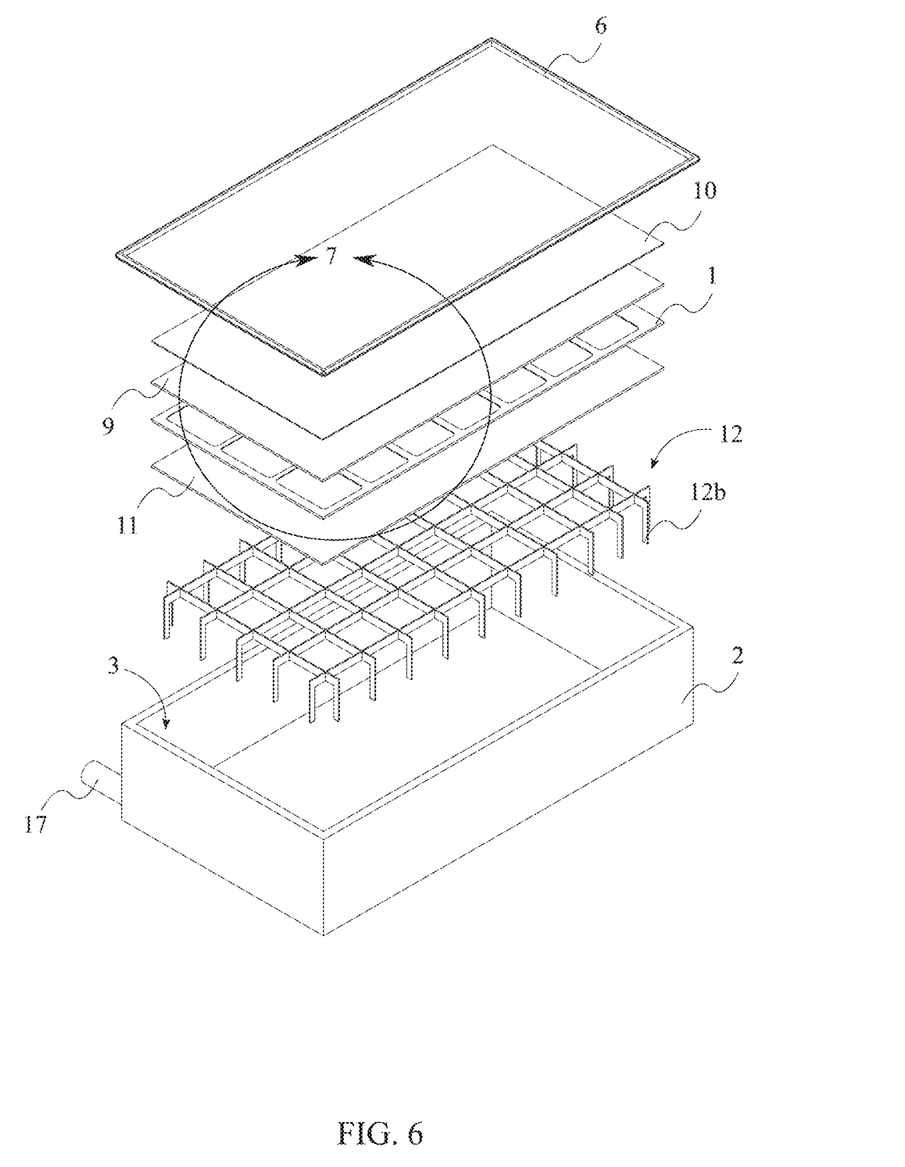
FIG. 6 is an exploded top-rear-left perspective view of the present invention.

According to the preferred embodiment, the heat transferring system 4 comprises a heat conducting layer 11 and a heat conducting grid structure 12. Preferably, the heat conducting layer 11 is a metal sheet that helps transfer the trapped heat from the solar panel to the heat conducting grid structure. To that end, the first surface 1a of the solar panel 1 is pressed against the heat conducting layer 11. As seen in FIG. 4 through FIG. 6, the heat conducting grid structure 12 comprises a grid frame 12a and a plurality of legs 12b. The heat conducting layer 11 is mounted onto the grid frame 12a, opposite the second end 2b of the water reservoir 2. The plurality of legs 12b extends from the grid frame 12a into the inner cavity 3 to help transfer the heat from the heat conducting sheet 11 to the water in the water reservoir 2. Further, bottom ends of the plurality of legs 12b touch the bottom part or the second end 2b of the water reservoir 2. The plurality of legs 12b helps elevate the solar panel 1 and the other components of the present invention from above the water within the water reservoir 2. In other words, to prevent the unit from collapsing from the vacuum, the distillation unit uses a grill that has many hollow legs that also act like thermal tubes to quickly move the heat from the panels to the dirty water. In the preferred embodiment, the plurality of legs 12b comprises copper tubes. However, it should be noted that the heat transferring system 4 may comprise any material, shape, components, arrangement of components, etc. that are known to one of ordinary skill in the art as long as the intents of the present invention are fulfilled.

Figure 2:
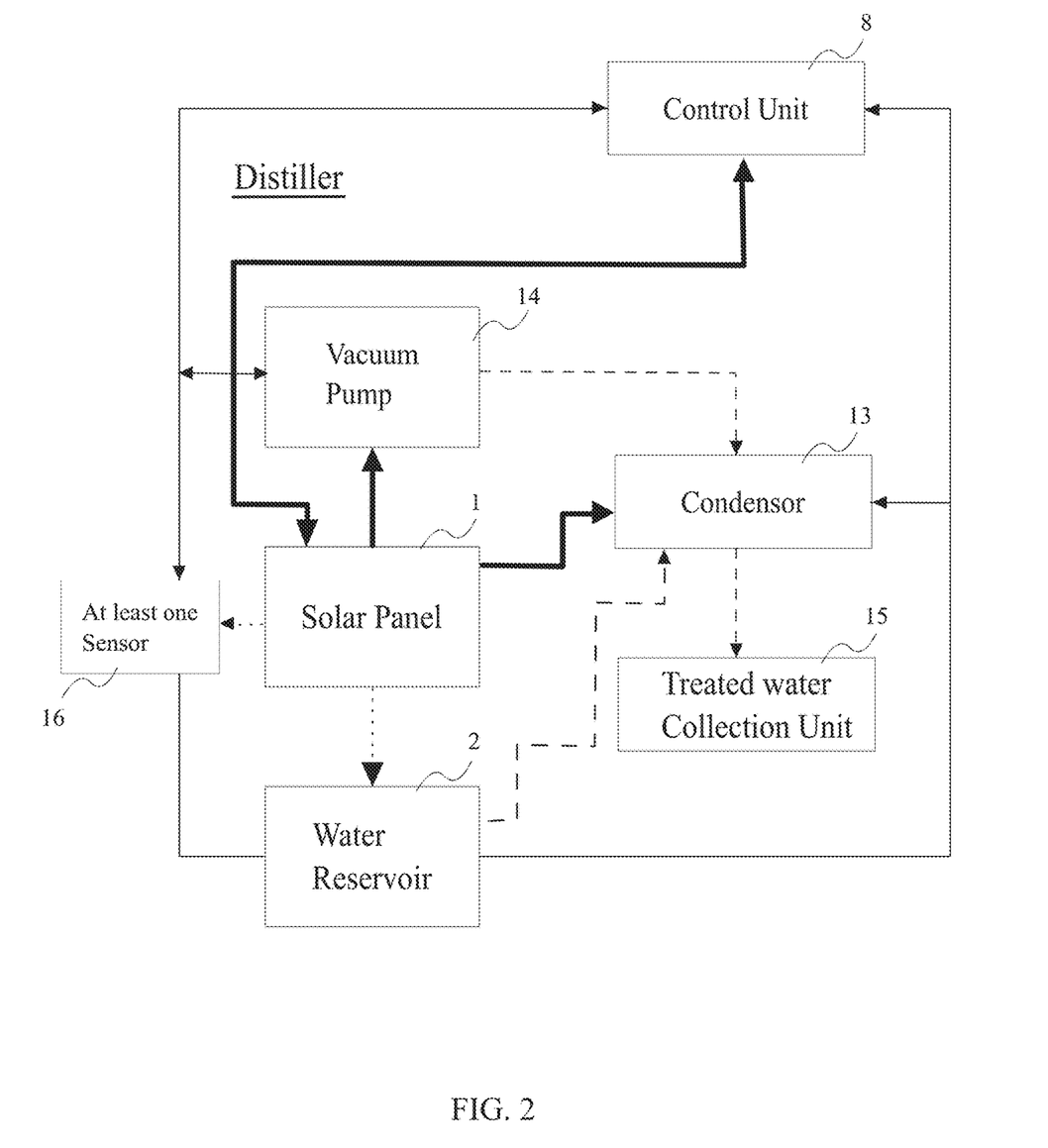
FIG. 2 is a detailed block diagram of the present invention, wherein thicker lines represent electrical connections, thinner lines represent electronic connections, broken lines represent fluid connections, and dotted lines represent thermal connections between components of the present invention.
Figure 3:
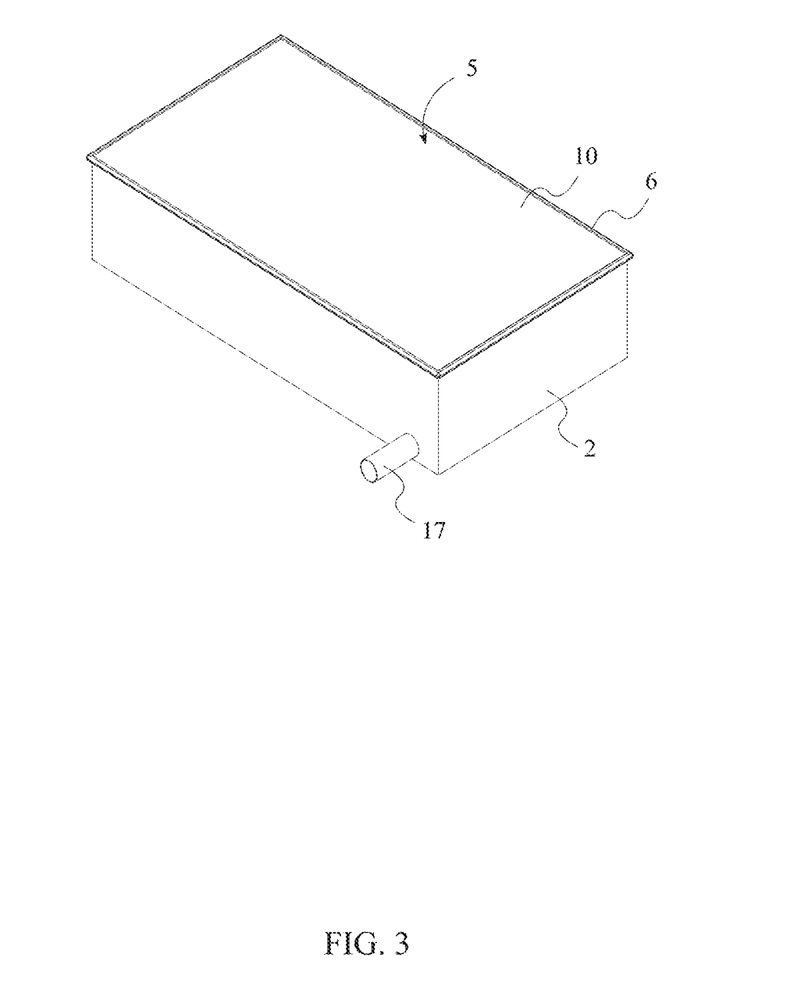
FIG. 3 is a top-front-left perspective view of the present invention.

Continuing with the preferred embodiment and in reference to FIG. 2, the present invention is intended to perform vacuum distillation with just the energy from the solar panel 1. To that end, the present invention comprises a condenser 13, and a vacuum pump 14. In order to provide electrical power to the device, the solar panel 1 is electrically connected to the condenser 13 and the vacuum pump 14. Further, in order to perform the various functions of the water purification system, the control unit 8 is electronically connected to the condenser 13 and the vacuum pump 14. Furthermore, the water reservoir 2 is in fluid communication with the condenser 13, and the vacuum pump 14 is in fluid communication with the condenser 13. This is because some compounds present in the dirty water may have very high boiling points and, in such cases, vacuum can be used to lower the boiling point of the dirty water instead of increasing the temperature. Once the pressure is lowered to the vapor pressure of the compound, the distillation process can start, and steam can easily flow from the water reservoir 2 to the condenser 13. Preferably, the condenser 13 and the vacuum pump 14 are mounted offset from the water reservoir 2. In other words, the vacuum pump 14 and condenser 13 are housed in a separate unit attached to the side of the water reservoir 2. In order to collect the treated or purified water post the distillation process, the present invention comprises a water collection unit 15. Preferably, the water collection unit 15 is laterally offset from the condenser 13 or mounted below the condenser 13. Further, the water collection unit 15 is in fluid communication with the condenser 13, so that condensed pure water may drip into or collected by the water collection unit 15.

According to the preferred embodiment, the present invention comprises at least one sensor 16. Preferably, the at least one sensor 16 is thermally connected to the solar panel 1 and the at least one sensor 16 is electronically connected to the control unit 8. This is so that the at least one sensor 16 can sense the temperature of the solar panel 1 and send a signal to the control unit 8 if the solar panel 1 is overheating due to lack of water in the water reservoir 2 or due to any other reasons. In other words, the at least one sensor 16 is operatively connected to the at least one heat sensitive vent 7 through the control unit 8, wherein the at least one sensor 16 governs opening and closing of the at least one heat sensitive vent 7 based on the temperature of solar panel 1.

As seen in FIG. 4 through FIG. 6, the present invention comprises an inlet port 17. Preferably, the inlet port 17 is laterally integrated onto the water reservoir 2, so that dirty water or water that needs purification is sent into the water reservoir 2 through the inlet port 17. In other words, the inlet port 17 is in fluid communication with the inner cavity 3 of the water reservoir 2, wherein impure water is input into the inner cavity 3 through the inlet port 17. To help with this and not interfere with the functioning of other components mounted within the water reservoir 2, the inlet port 16 is positioned adjacent to the second end 2b of the water reservoir 2.

It should be noted that any other components, or arrangement of components that are needed for the smooth functioning of the water purification system, fall under the scope of the present invention. Examples of such components include, but are not limited to pipes, containers, sensors, thermal readers, electrical circuit boards, pressure gauges, etc.

Although the invention has been explained in relation to its preferred embodiment, it is to be understood that many other possible modifications and variations can be made without departing from the spirit and scope of the invention as hereinafter claimed.

What is claimed is:

1. A solar powered water purification device, comprising:
a solar panel;
a water reservoir;
an inner cavity;
a heat transferring system;
a solar lid;
a frame;
at least one heat sensitive vent;
a control unit;
the solar panel comprising a first surface and a second surface;
the first surface being positioned opposite to the second surface across the solar panel;
the inner cavity traversing into the water reservoir;
the inner cavity extending from a first end of the water reservoir towards a second end of the water reservoir, wherein the first end is positioned opposite to the second end across the water reservoir;
the heat transfer system being mounted between the inner cavity and the first surface of the solar panel;
the solar panel being thermally connected to the inner cavity of the water reservoir through the heat transfer system;
the solar panel being laterally offset from the second end of the water reservoir through the heat transfer system;
the solar lid being mounted onto the first end of the water reservoir, and touching the second surface of the solar panel;
the frame being perimetrically mounted around the solar lid;
the at least one heat sensitive vent being laterally integrated along the frame;
the control unit being electronically connected to the solar panel, and the water reservoir; and
the control unit being operatively connected to the at least one heat sensitive vent, wherein the control unit actuates opening and closing of the at least one heat sensitive vent.

2. The solar powered water purification device of claim 1, comprising:
the heat transferring device comprising a heat conducting layer and a heat conducting grid structure;
the heat conducting grid structure comprising a grid frame and a plurality of legs;
the plurality of legs extending from the grid frame into the inner cavity;
and
the heat conducting layer being mounted onto the grid frame, opposite to the second end of the water reservoir.

3. The solar powered water purification device of claim 2, wherein the heat conducting layer is a metal sheet.

4. The solar powered water purification device of claim 2, wherein the heat conducting grid structure is made of copper tubes.

5. The solar powered water purification device of claim 2, wherein the first layer of the solar panel being pressed against the heat conducting layer.

6. The solar powered water purification device of claim 1, comprising:
a condenser;
a vacuum pump;
the solar panel being electrically connected to the condenser and the vacuum pump;
the control unit being electronically connected to the condenser and the vacuum pump;
the water reservoir being in fluid communication with the condenser; and
the vacuum pump being in fluid communication with the condenser.

7. The solar powered water purification device of claim 6, wherein the condenser and the vacuum pump are mounted offset from the water reservoir.

8. The water purification device of claim 6, comprising:
a water collection unit;
the water collection unit being laterally offset from the condenser; and
the water collection unit being in fluid communication with the condenser.

9. The solar powered water purification device of claim 1, comprising:
at least one sensor;
the at least one sensor being thermally connected to the solar panel;
the at least one sensor being electronically connected to the control unit;
the at least one sensor being operatively connected to the at least one heat sensitive vent through the control unit, wherein the at least one sensor governs opening and closing of the at least one heat sensitive vent based on the temperature of solar panel.

10. The solar powered water purification device of claim 1, the solar lid comprising:
a protective glass layer and an insulating layer;
the protective glass layer being mounted onto the second surface of the solar panel; and
the insulating layer being mounted onto the protective glass layer, wherein the insulating layer provides thermal insulation to the solar panel.

11. The solar powered water purification device of claim 1, comprising:
an inlet port;
the inlet port being laterally integrated onto the water reservoir;

the inlet port being positioned adjacent to the second end of the water reservoir; and the inlet port being in fluid communication with the inner cavity of the water reservoir, wherein impure water is input into the inner cavity through the inlet port.

12. The solar powered water purification device of claim 1, wherein the water reservoir is black in color.

13. A solar powered water purification device, comprising:
- a solar panel;
- a water reservoir;
- an inner cavity;
- a heat transferring system;
- a solar lid;
- a frame;
- at least one heat sensitive vent;
- a control unit;
- the heat transferring system comprising a heat conducting layer and a heat conducting grid structure;
- the solar panel comprising a first surface and a second surface;
- the first surface being positioned opposite to the second surface across the solar panel;
- the inner cavity traversing into the water reservoir;
- the inner cavity extending from a first end of the water reservoir towards a second end of the water reservoir, wherein the first end is positioned opposite to the second end across the water reservoir;
- the heat transfer system being mounted between the inner cavity and the first surface of the solar panel;
- the solar panel being thermally connected to the inner cavity of the water reservoir through the heat transfer system;
- the solar panel being laterally offset from the second end of the water reservoir through the heat transfer system;
- the solar lid being mounted onto the first end of the water reservoir, and touching the second surface of the solar panel;
- the frame being perimetrically mounted around the solar lid;
- the at least one heat sensitive vent being laterally integrated along the frame;
- the heat conducting grid structure comprising a grid frame and a plurality of legs;
- the plurality of legs extending from the grid frame into the inner cavity;
- the heat conducting layer being mounted onto the grid frame, opposite to the second end of the water reservoir;
- the control unit being electronically connected to the solar panel, and the water reservoir; and
- the control unit being operatively connected to the at least one heat sensitive vent, wherein the control unit actuates opening and closing of the at least one heat sensitive vent.

14. The solar powered water purification device of claim 13, comprising:
- a condenser;
- a vacuum pump;
- the solar panel being electrically connected to the condenser and the vacuum pump;
- the control unit being electronically connected to the condenser and the vacuum pump;
- the water reservoir being in fluid communication with the condenser; and
- the vacuum pump being in fluid communication with the condenser.

15. The solar powered water purification device of claim 14, wherein the condenser and the vacuum pump are mounted offset from the water reservoir.

16. The water purification device of claim 14, comprising:
- a water collection unit;
- the water collection unit being laterally offset from the condenser; and
- the water collection unit being in fluid communication with the condenser.

17. The solar powered water purification device of claim 13, comprising:
- at least one sensor;
- the at least one sensor being thermally connected to the solar panel;
- the at least one sensor being electronically connected to the control unit;
- the at least one sensor being operatively connected to the at least one heat sensitive vent through the control unit, wherein the at least one sensor governs opening and closing of the at least one heat sensitive vent based on the temperature of solar panel.

18. The solar powered water purification device of claim 13, the solar lid comprising:
- a protective glass layer and an insulating layer;
- the protective glass layer being mounted onto the second surface of the solar panel; and
- the insulating layer being mounted onto the protective glass layer, wherein the insulating layer provides thermal insulation to the solar panel.

19. The solar powered water purification device of claim 13, comprising:
- an inlet port;
- the inlet port being laterally integrated onto the water reservoir;
- the inlet port being positioned adjacent to the second end of the water reservoir; and
- the inlet port being in fluid communication with the inner cavity of the water reservoir, wherein impure water is input into the inner cavity through the inlet port.

20. The solar powered water purification device of claim 13, wherein the water reservoir is black in color.

* * * * *